US00RE42490E

(19) United States
(12) Reissued Patent
Takeuchi et al.

(10) Patent Number: US RE42,490 E
(45) Date of Reissued Patent: Jun. 28, 2011

(54) DEVICE AND METHOD FOR AMPLIFYING SUCTION NOISE

(75) Inventors: Shinichi Takeuchi, Ebina (JP); Hiroshi Shimada, Machida (JP); Takeharu Sasaoka, Sagmihara (JP)

(73) Assignee: Nissan Motor Co., Ltd., Yokohama-shi, Kanagawa (JP)

(21) Appl. No.: 12/911,938

(22) Filed: Oct. 26, 2010

Related U.S. Patent Documents

Reissue of:
(64) Patent No.: 7,717,230
Issued: May 18, 2010
Appl. No.: 11/810,058
Filed: Jun. 4, 2007

(30) Foreign Application Priority Data

Jun. 5, 2006 (JP) ..... 2006-155945

(51) Int. Cl.
*F01N 1/16* (2006.01)

(52) U.S. Cl. ... 181/271; 181/167; 181/174; 123/184.57; 123/184.53; 123/184.55; 123/184.54; 123/184.56; 180/309; 180/296; 180/68.3

(58) Field of Classification Search ..... 181/271, 181/250, 202, 18, 167, 174, 212, 214; 123/184.53, 123/184.54, 184.55, 184.56, 184.57; 340/381.1, 340/438, 439, 384.3; 180/309, 296, 68.3
See application file for complete search history.

(56) References Cited

U.S. PATENT DOCUMENTS 983,416 A * 2/1911 Young ..... 181/164
1,741,841 A * 12/1929 Hecht et al. ..... 181/164
1,844,487 A * 2/1932 Tyrrell ..... 181/164
1,856,791 A * 5/1932 Shida ..... 181/164
1,997,790 A * 4/1935 Heidrich ..... 181/164
2,531,634 A * 11/1950 Lawrance ..... 181/164
2,974,204 A * 3/1961 Supitilov ..... 381/420
3,032,138 A * 5/1962 Haerther, Jr. ..... 181/164
4,100,992 A * 7/1978 Rehde et al. ..... 181/166
4,135,601 A * 1/1979 Tsukagoshi et al. ..... 181/167
4,299,121 A * 11/1981 Asayama et al. ..... 73/114.35
4,300,655 A * 11/1981 Sakamoto et al. ..... 181/167
4,320,264 A * 3/1982 Visan et al. ..... 381/164
4,508,192 A * 4/1985 Fidi et al. ..... 181/158
4,512,435 A * 4/1985 Takeuchi et al. ..... 181/170
4,655,316 A * 4/1987 Murray ..... 181/164
4,699,242 A * 10/1987 Ono ..... 181/170
4,847,908 A * 7/1989 Nieuwendijk et al. ..... 381/424
5,256,837 A * 10/1993 Pak ..... 181/164

(Continued)

FOREIGN PATENT DOCUMENTS

EP 0 704 617 4/1996

(Continued)

*Primary Examiner* — Elvin G Enad
*Assistant Examiner* — Forrest M Phillips
(74) *Attorney, Agent, or Firm* — Young Basile

(57) ABSTRACT

A device for amplifying the suction noise of a vehicle is disclosed. The device comprises an intake duct, a connecting pipe and a composite membrane. The intake duct is for feeding air to an engine intake port. A connecting pipe is connected to an interior of the intake duct. The composite membrane is positioned within the connecting pipe. The composite member blocks an interior passage formed in the connecting pipe. The composite member further includes at least two elastic membranes with one of masses and rigidities that different from each other. A method is also disclosed.

21 Claims, 10 Drawing Sheets

U.S. PATENT DOCUMENTS 5,304,746 A * 4/1994 Purvine ..... 181/148
5,349,141 A * 9/1994 Horibe et al. ..... 181/224
5,996,733 A * 12/1999 DeTuncq et al. ..... 181/250
6,551,389 B2 * 4/2003 Spannbauer et al. ..... 96/380
6,600,408 B1 * 7/2003 Walter et al. ..... 340/384.1
6,626,263 B2 * 9/2003 Sahyoun ..... 181/157
6,634,456 B2 * 10/2003 Peng ..... 181/171
6,644,436 B2 * 11/2003 Hofmann et al. ..... 181/214
6,704,426 B2 * 3/2004 Croft, III ..... 381/351
6,932,189 B2 * 8/2005 Helber et al. ..... 181/240
7,188,703 B2 * 3/2007 Hofmann et al. ..... 181/271
7,306,073 B2 * 12/2007 Frasl ..... 181/173
7,350,496 B2 * 4/2008 Nakayama et al. ..... 123/184.57
7,353,791 B2 * 4/2008 Sasaki et al. ..... 123/184.57
7,441,527 B2 * 10/2008 Hayashi et al. ..... 123/184.53
7,448,353 B2 * 11/2008 Shinada et al. ..... 123/184.57
7,463,747 B2 * 12/2008 Kuze et al. ..... 381/345
7,464,788 B2 * 12/2008 Alex et al. ..... 181/250
7,477,755 B2 * 1/2009 Saiki et al. ..... 381/349
7,483,545 B2 * 1/2009 Nagaoka ..... 381/423
7,487,755 B2 * 2/2009 Harada ..... 123/184.57
2001/0033670 A1 * 10/2001 Tai et al. ..... 381/174
2002/0121403 A1 * 9/2002 Sahyoun ..... 181/157
2002/0157897 A1 * 10/2002 Hofmann et al. ..... 181/214
2003/0015369 A1 * 1/2003 Sahyoun ..... 181/157
2003/0057015 A1 * 3/2003 Helber et al. ..... 181/240
2005/0036645 A1 * 2/2005 Carver ..... 381/395
2005/0121254 A1 * 6/2005 Hofmann et al. ..... 181/237
2005/0121255 A1 * 6/2005 Hofmann et al. ..... 181/250
2005/0121256 A1 * 6/2005 Hofmann et al. ..... 181/271
2005/0133300 A1 * 6/2005 Hofmann et al. ..... 181/250
2006/0008111 A1 * 1/2006 Nagaoka ..... 381/423
2006/0042873 A1 * 3/2006 Alex et al. ..... 181/250
2006/0060419 A1 * 3/2006 Alex et al. ..... 181/250
2006/0065479 A1 * 3/2006 Okawa et al. ..... 181/250
2006/0283658 A1 * 12/2006 Abe et al. ..... 181/204
2007/0079784 A1 * 4/2007 Sasaki et al. ..... 123/184.53
2007/0127760 A1 * 6/2007 Saiki et al. ..... 381/351
2007/0131189 A1 * 6/2007 Shinada et al.
2007/0147645 A1 * 6/2007 Kuze et al. ..... 381/337
2007/0163533 A1 * 7/2007 Nakayama et al. ..... 123/184.57
2007/0201712 A1 * 8/2007 Saiki ..... 381/186
2007/0261912 A1 * 11/2007 Langberg ..... 181/171
2007/0277768 A1 * 12/2007 Takeuchi et al. ..... 123/184.57
2007/0291965 A1 * 12/2007 Noro et al. ..... 381/182
2008/0149201 A1 * 6/2008 Sommerville et al. ..... 137/593
2008/0212818 A1 * 9/2008 DelPapa et al. ..... 381/345
2009/0000587 A1 * 1/2009 Seko et al. ..... 123/184.57
2009/0028376 A1 * 1/2009 Saito et al. ..... 381/423
2009/0031981 A1 * 2/2009 Osumi ..... 123/184.57

FOREIGN PATENT DOCUMENTS

EP 1 111 228 A2 6/2001
EP 1 772 614 A2 4/2007
EP 1 808 594 A1 7/2007
JP 2000045895 2/2000
JP 2000303925 10/2000
JP 2005139982 6/2005
WO 2005/045225 A1 5/2005

* cited by examiner

DEVICE AND METHOD FOR AMPLIFYING SUCTION NOISE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from Japanese Patent Application Serial No. [2006-155944] *2006-155945* filed Jun. 5, 2006[, the disclosure of which, including its specification, drawings and claims, are incorporated herein by reference in its entirety].

TECHNICAL FIELD

The present disclosure pertains to a type of device for improving the sound quality of a suction noise generated by an intake system of an automobile or the like.

BACKGROUND

Japanese Patent No. 3613665 describes a known device that boosts suction noise. The device described therein is for amplifying suction noise and has plural intake ducts having resonance frequencies that are different from each other, so that it is possible to boost the suction noise at different frequencies, and permits introduction of suction noise into the vehicle passenger compartment.

However, the device for amplifying suction noise described in Japanese Patent No. 3613665 has some disadvantages. First, because the device is constituted with plural intake ducts, there is no leeway in the space required inside the engine compartment. Thus, there are restrictions on the layout, and the device is difficult to install in the engine compartment.

SUMMARY

The present disclosure provides a device to boost the suction noise of a vehicle characterized by the fact that resonance of an elastic membrane, due to variation in pressure of air transmitted into an engine intake port, is allowed to occur at least two different frequencies.

According to the present disclosure, it is possible to boost suction noise at plural frequencies without the need of plural intake ducts, so that it is possible to generate impressive suction noise, and at the same time to improve the freedom of design layout.

One embodiment of the disclosure includes a device for amplifying the suction noise of a vehicle. The embodiment of the device comprises an intake duct, a connecting pipe and a composite membrane. The intake duct is for feeding air to an engine intake port. A connecting pipe is connected to an interior of the intake duct. The composite membrane is positioned within the connecting pipe. The composite member blocks an interior passage formed in the connecting pipe. The composite member further includes at least two elastic membranes with one of masses and rigidities that different from each other. A method is also disclosed.

BRIEF DESCRIPTION OF DRAWINGS

Other features and advantages of the present disclosure will be apparent from the ensuing description, taken in conjunction with the accompanying drawings, in which.

DETAILED DESCRIPTION

Figure 1A:
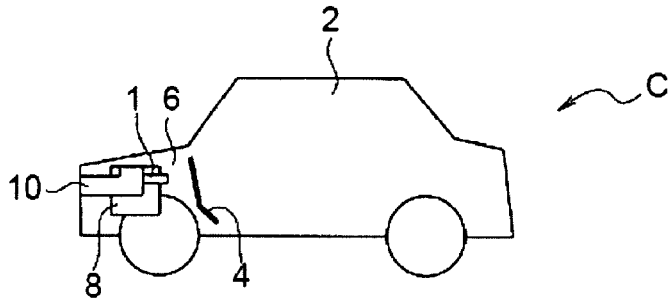
FIG. 1A is a side elevational view of a vehicle equipped with a device for amplifying a suction noise of a vehicle.

While the claims are not limited to the illustrated embodiments, an appreciation of various aspects of the apparatus is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

Embodiment 1

Figure 1B:
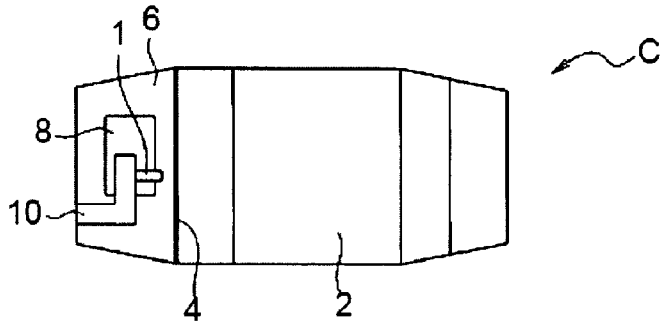
FIG. 1B is a top plan view of the vehicle of FIG. 1A.
Figure 1C:
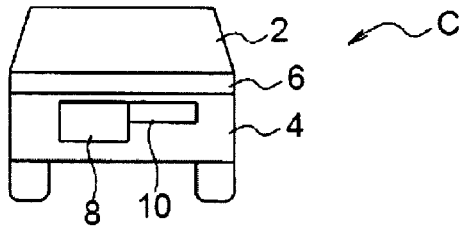
FIG. 1C is a front elevational view of the vehicle of FIG. 1A.

FIGS. 1A-1C includes diagrams illustrating a vehicle C carrying a device 1 for amplifying suction noise according to a first embodiment. FIG. 1A is a side view of a vehicle C. FIG. 1B is a top view of vehicle C. And FIG. 1C is a front view of vehicle C.

As can be seen from FIG. 1, device 1 that boosts suction noise in the first embodiment is arranged in front of a vehicle passenger compartment 2. Indeed, device 1 is arranged in an engine compartment 6 that is separated from vehicle passenger compartment 2 by a dash panel 4. Further, device 1 is arranged on an intake duct 10 that is connected to an engine 8.

The resonant vibration of air in intake duct 10 takes place in air intake duct 10. When resonance occurs, pressure variations develop in air in intake duct 10, and these pressure variations in the air are perceived by humans as noise. The noise accompanying intake is called suction noise. The frequency of the suction noise depends on the frequency of the pressure variations generated due to the resonance phenomenon. The frequency of the pressure variation that takes place due to the resonance phenomenon is determined by the resonance frequency, which depends on the length of the intake duct, etc.

Figure 2:
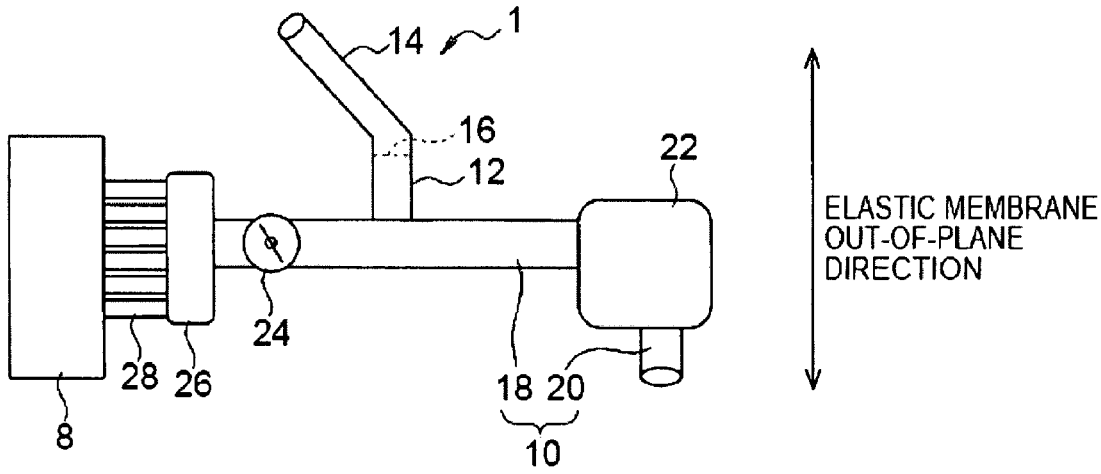
FIG. 2 is a diagram illustrating the structure of the device for amplifying suction noise according to a first embodiment.

FIG. 2 is a diagram illustrating the structure of device 1 that amplifies the suction noise in the first embodiment. As shown in FIG. 2, device 1 that amplifies the suction noise in the first embodiment comprises a connecting pipe 12, an additional pipe 14, and a composite membrane 16 (represented by dashed lines in FIG. 2).

In the embodiment shown, connecting pipe 12 is generally cylindrical, and is attached to an outer peripheral surface of intake duct 10, which may be formed of a draft tube with air inside it. Connecting pipe 12 communicates with intake duct 10.

Similar to connecting pipe 12, additional pipe 14 may also be generally cylindrical. A first opening at one end of additional pipe 14 is connected to connecting pipe 12, and a second opening at the other end of additional pipe 14 opens to external air.

Composite membrane 16 is generally disk-shaped and may be made of, for example, rubber or another elastic material. Composite member 16 is attached on an inner peripheral surface of connecting pipe 12 and extends across an interior of connecting pipe 12 so as to close connecting pipe 12. Composite membrane 16 undergoes elastic deformation during intake by engine 8, corresponding to variation in an intake vacuum generated in air inside intake duct 10, so that vibration of composite membrane 16 occurs in an out-of-plane direction. The detailed structure of composite membrane 16 will be explained later.

The structure of intake duct 10 and the parts related to thereto will now be explained.

Intake duct 10 forms an intake path from the external air to engine 8, and is comprised of a dust side intake duct 20 and a clean side intake duct 18.

A first opening at one end of dust side intake duct 20 is connected to an air cleaner 22, and a second opening at the other end of dust side intake duct 20 opens to the external air.

Clean side intake duct 18 includes a throttle chamber 24. A first opening at one end of clean side intake duct 18 is connected to air cleaner 22, and a second opening at the other end of clean side intake duct 18 is connected via a surge tank 26 to various portions of an intake manifold 28 to the various cylinders (not shown in the figure) of engine 8.

For example, air cleaner 22 includes an oiled filter or other filter part for cleaning air flowing from the second opening at one end of dust side intake duct 10 as it passes through the filter portion.

Throttle chamber 24 is installed between air cleaner 22 and surge tank 26, and is connected to an accelerator pedal (not shown in the figure). Throttle chamber 24 adjusts the airflow rate from air cleaner 22 to surge tank 26 corresponding to the amount of accelerator pedal depression. When the amount of accelerator pedal depression is reduced, the airflow rate from air cleaner 22 to surge tank 26 is decreased, so that the rotational velocity of engine 8 falls, and at the same time the intake vacuum generated in the air inside intake duct 10 is reduced. On the other hand, when the amount of accelerator pedal depression is increased, the airflow rate from air cleaner 22 to surge tank 26 is increased, so that the rotational velocity of engine 8 rises, and at the same time, the intake vacuum generated in the air in intake duct 10 is increased.

During intake, engine 8 draws air that has flowed from the opening at the second end of dust side intake duct 20 and is present inside clean side intake duct 18 into the various cylinders via surge tank 26 and intake manifold 28.

Also, in conjunction with the intake operation, engine 8 becomes a pressure source that generates intake pulsation in the air inside intake duct 10, and this intake pulsation results in suction noise.

Here, the intake pulsation that occurs in conjunction with the intake operation of engine 8 is a pressure variation generated in the air inside intake duct 10. This pressure variation is composed of plural pressure variations at different frequencies. That is, the intake pulsation that occurs in conjunction with the intake operation of engine 8 is composed of plural intake pulsations at different frequencies. In the first embodiment, engine 8 is assumed to be a 6-cylinder in-line engine. However, engine 8 is not limited to this construction.

Figure 3:
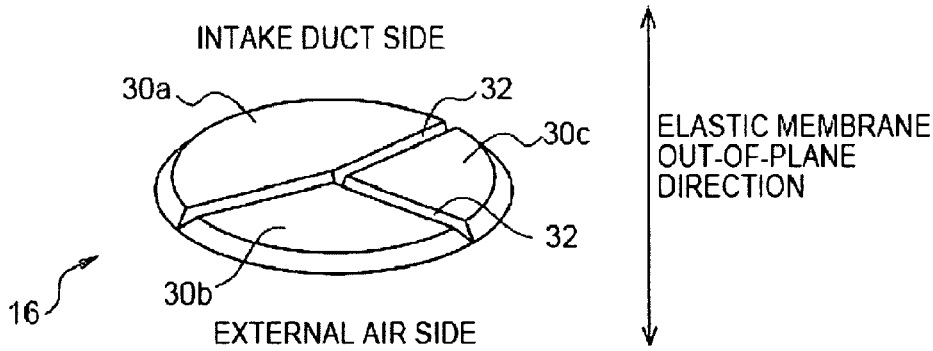
FIG. 3 is a diagram illustrating in detail the structure of a composite membrane.

FIG. 3 is a diagram illustrating the detailed structure of composite membrane 16.

Viewed in the thickness direction of composite membrane 16, as may be seen, composite membrane 16 includes three elastic membranes 30a-30c. Elastic membranes 30a-30c are separated from each other by slots 32 formed in the surface on an intake duct side of composite membrane 16. In the embodiment shown, and slots 32 are formed in shapes having different areas. More specifically, area Sa of elastic membrane 30a is larger than area Sb of elastic membrane 30b, and area Sb of said elastic membrane 30b is larger than area Sc of elastic membrane 30c. That is, elastic membranes 30a-30c are formed to satisfy the relationship Sa>Sb>Sc.

Here, because elastic membranes 30a-30c have different areas from each other, their resonance frequencies for vibration in the out-of-plane direction of composite membrane 16 are different from each other.

The resonance frequency is that for vibration at a prescribed frequency detected when an object is allowed to vibration freely. Any object has a natural resonance frequency. Usually, an object has plural resonance frequencies. The resonance frequency depends on the rigidity and mass of the object. More specifically, the higher the rigidity, the higher the resonance frequency, while the larger the mass, the lower the resonance frequency. Here, rigidity refers to the proportionality coefficient between a bending or twisting force applied to the structural body and the deflection of the structural body as a whole.

Consequently, because elastic membranes 30a-30c have different areas, they differ from each other in rigidity and mass. As a result, they have different resonance frequencies.

Compared with elastic membrane 30c with a smaller area, elastic membrane 30a with a larger area has a lower resonance frequency for vibration in the out-of-plane direction. Consequently, for said elastic membranes 30a-30c, assuming the resonance frequency of elastic membrane 30a to be first resonance frequency f1, the resonance frequency of elastic membrane 30b to be second resonance frequency f2, and the resonance frequency of elastic membrane 30c to be third resonance frequency f3, the following conditional relationship among them applies: f1<f2<f3.

Also, elastic membranes 30a-30c are appropriately formed such that their resonance frequencies correspond to intake pulsation at a first frequency, intake pulsation at a second frequency and intake pulsation at a third frequency selected from among the intake pulsations at plural frequencies that form the intake pulsation generated in conjunction with the intake operation of engine 8. More specifically, first resonance frequency f1 of elastic membrane 30a matches the first intake pulsation frequency, second resonance frequency f2 of elastic membrane 30b matches the second intake pulsation frequency, and third resonance frequency f3 of elastic membrane 30c matches the third intake pulsation frequency.

Here, the first frequency is lower than the second frequency and the second frequency is lower than the third frequency. That is, the first frequency, second frequency and third frequency satisfy the following relationship: first frequency<second frequency<third frequency.

The first frequency is the frequency of the intake pulsation generated when the engine rotates at a prescribed rotational velocity R1, the second frequency is the frequency of the intake pulsation generated at a prescribed rotational velocity R2, and the third frequency is the frequency of the intake pulsation generated at a prescribed rotational velocity R3.

Here, R1 is a rotational velocity lower than R2 and R2 is a rotational velocity lower than R3. That is, rotational velocities R1, R2, R3 satisfy the following relationship: R1<R2<R3.

In addition, each of slots 32 is formed between two adjacent elastic membranes, and they form rigidity changing portions having different rigidities from those of elastic membranes 30a-30c.

The operation of the first embodiment of device 1 that amplifies the suction noise will now be explained.

When engine 8 is started, the intake pulsation generated in conjunction with the intake operation of engine 8 is propagated via intake manifold 28 and surge tank 26 into the air inside intake duct 10 (see FIG. 2).

While engine 8 is running, as the amount of accelerator pedal depression is increased, the airflow rate from air cleaner 22 to surge tank 26 is increased (hereinafter to be referred to as acceleration mode). As a result, while the rotational velocity of engine 8 is increased, the intake vacuum generated for the air in intake duct 10 rises (see FIG. 2).

In the following, the operation of elastic membranes 30a-30c in the acceleration mode will be explained in more detail with reference to FIGS. 4-6.

Figure 4:
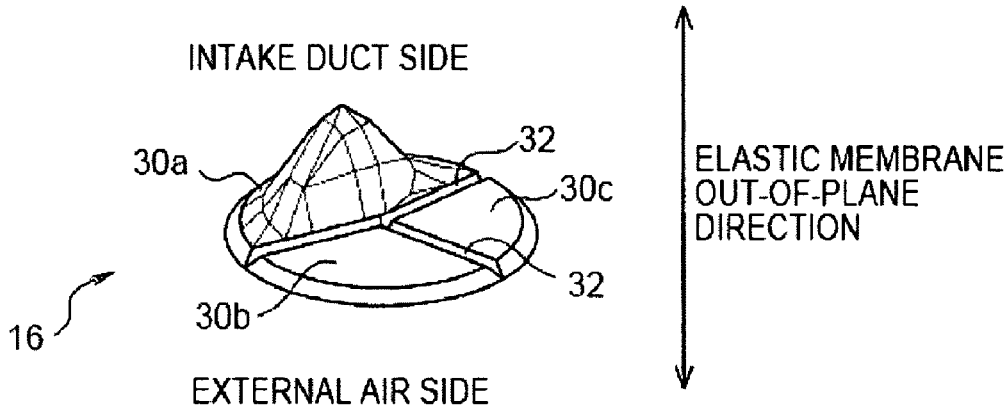
FIG. 4 is a diagram illustrating a vibration state of each elastic membrane in an out-of-plane direction of the composite membrane during a first acceleration mode.
Figure 5:
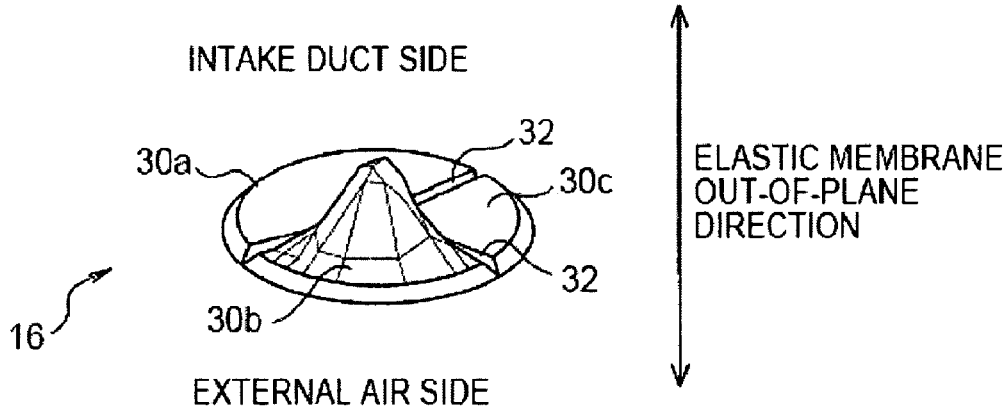
FIG. 5 is a diagram illustrating a vibration state of each elastic membrane in the out-of-plane direction of the composite membrane during a second acceleration mode.
Figure 6:
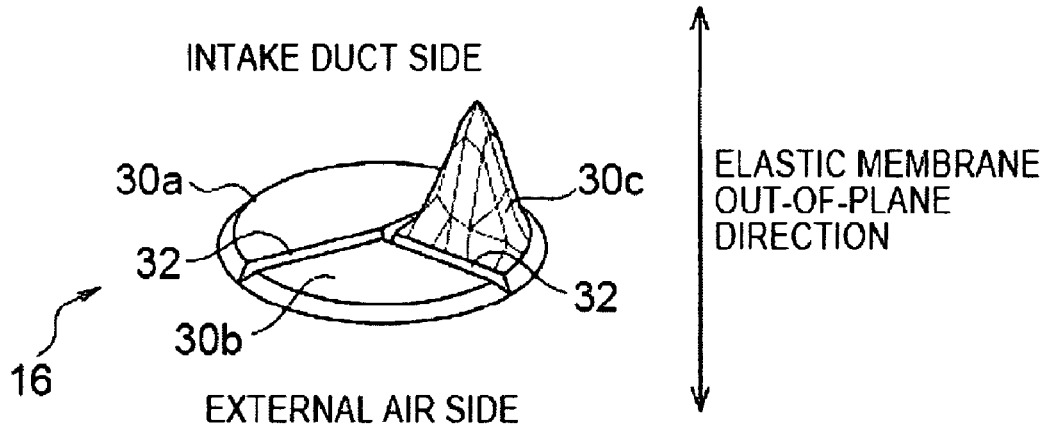
FIG. 6 is a diagram illustrating the vibration state of each elastic membrane in an out-of-plane direction of the composite membrane during a third acceleration mode.

FIGS. 4-6 are diagrams illustrating the vibration of elastic membranes 30a-30c in the out-of-plane direction of the composite membrane 16 during the acceleration mode. FIG. 4 is a diagram illustrating the state when the rotational velocity of the engine is R1; FIG. 5 is a diagram illustrating the state when the rotational velocity of the engine is R2; and FIG. 6 is a diagram illustrating the state when the rotational velocity of the engine is R3.

When the rotational velocity of the engine is R1, among the plural intake pulsations at different frequencies that form the intake pulsation generated in conjunction with the intake operation of the engine, an intake pulsation at the first frequency is propagated via connecting pipe 12 to composite membrane 16.

As illustrated in FIG. 4, because in this case the frequency of the intake pulsation at the first frequency matches first resonance frequency f1 of elastic membrane 30a, only elastic membrane 30a among the elastic membranes 30a-30c vibrates in the out-of-plane direction of composite membrane 16. When elastic membrane 30a vibrates in the out-of-plane direction of composite membrane 16, it causes pressure variations in the air in additional pipe 14 on the side of composite membrane 16 that is open to the external air. There, air pressure variations become noise that is emitted to an external air side, and the suction noise is thereby amplified.

When the amount of accelerator pedal depression is further increased, that is, when the rotational velocity of the engine is at R2, among the plural intake pulsations at different frequencies that form the intake pulsation in conjunction with the intake operation of the engine, the intake pulsation at the second frequency is propagated via connecting pipe 12 to composite membrane 16.

As shown in FIG. 5, because in this case the frequency of the intake pulsation at the second frequency matches second resonance frequency f2 of elastic membrane 30b, only elastic membrane 30b among elastic membranes 30a-30c vibrates in the out-of-plane direction of composite membrane 16. When elastic membrane 30b vibrates in the out-of-plane direction of composite membrane 16, it causes pressure variations in the air between composite membrane 16 and the second opening of additional pipe 14, and said air pressure variations become noise that is emitted to the external air side, and the suction noise is thereby amplified.

When the amount of accelerator pedal depression is further increased, that is, when the rotational velocity of the engine is at R3, among the plural intake pulsations at different frequencies that form the intake pulsation in conjunction with the intake operation of the engine, the intake pulsation at the third frequency is propagated via connecting pipe 12 to composite membrane 16.

As shown in FIG. 6, because in this case the frequency of the intake pulsation at the third frequency matches third resonance frequency f3 of elastic membrane 30c, only elastic membrane 30c among elastic membranes 30a-30c vibrates in the out-of-plane direction of composite membrane 16. When elastic membrane 30c vibrates in the out-of-plane direction of composite membrane 16, it causes pressure variations in the air in additional pipe 14 on the side of composite membrane 16 that is open to the external air, and air pressure variations become noise that is emitted to the external air side, and therefore the suction noise is amplified.

Consequently, in the acceleration mode, elastic membranes 30a-30c with different resonance frequencies vibrate in the out-of-plane direction of the composite membrane according to variation in the rotational velocity of the engine. As a result, the suction noise at the first frequency, the suction noise at the second frequency and the suction noise at the third frequency are amplified, and the amplified suction noise is emitted to the external air side from the second opening at the additional pipe 14 (see FIG. 2).

When the amplified suction noise is emitted to the external air side from the second opening of additional pipe 14, the emitted suction noise is propagated via the air into vehicle passenger compartment 2 such that an impressive suction noise is transmitted into vehicle passenger compartment 2 (see FIG. 1).

Variations of Embodiment 1

For device 1 that amplifies the suction noise in the first embodiment, three elastic membranes 30a-30c are formed to have different resonance frequencies for vibration in the out-of-plane direction of composite membrane 16. However, it is understood that the present embodiment is not limited to this scheme. Indeed, a scheme may also be adopted in which among three elastic membranes 30a-30c, at least two elastic membranes have resonance frequencies for vibration in the out-of-plane direction of the composite membrane that are different from each other.

Also, for device 1 that amplifies the suction noise in the first embodiment, three elastic membranes 30a-30c are formed to have different resonance frequencies for vibration in the out-of-plane direction of composite membrane 16 by virtue of having different areas. The present embodiment is not limited to this scheme, however. That is, a scheme may also be adopted in which three elastic membranes 30a-30c are formed with the same area, and at the same time, they are formed different from each other with respect to rigidity and/or mass, so that the resonance frequencies for vibration in the out-of-plane direction of the composite membrane are different from each other. Here, to form an elastic membrane 30 having increased rigidity and/or mass, a core member may be arranged inside it, or a processed mass body for forming ribs on elastic membrane 30 may be attached, or the thickness of elastic membrane 30 may be increased. As a result, although elastic membrane 30 has the same area as the other elastic membranes, elastic membrane 30 nevertheless has higher rigidity and/or larger mass than the others. In this case, by selecting the rigidity and/or mass of each elastic membrane 30a, 30b, 30c to meet the required resonance frequency conditions for vibration in the out-of-plane direction of composite membrane 16, it is possible to set each elastic membrane 30a, 30b, 30c at a desired resonance frequency.

In the first embodiment, device 1 that amplifies the suction noise has a composite membrane 16 composed of three elastic membranes 30a-30c. The present embodiment is not limited to this scheme, however. A scheme can also be adopted in which composite membrane 16 is composed of two elastic membranes 30 or more than three elastic membranes 30.

Also, in the structure for device 1 that amplifies the suction noise of the present embodiment, device 1 that amplifies the suction noise is set in engine compartment 6 in front of vehicle passenger compartment 2. However, other locations for device 1 that amplifies the suction noise are contemplated. That is, for example, when vehicle C has an engine compartment 6 arranged behind vehicle passenger compartment 2, the location for device 1 that amplifies the suction noise can be in engine compartment 6 located behind vehicle passenger compartment 2. Also, for example, when vehicle C has an engine compartment 6 beneath vehicle passenger compartment 2, the location for device 1 that amplifies the suction noise can be within engine compartment 6 set beneath vehicle passenger compartment 2. In any case, the location of device 1 that amplifies the suction noise can be adjusted appropriately according to the configuration of vehicle C, that is, the position of engine compartment 6.

Viewing the device 1 for amplifying suction noise of the first embodiment in the thickness direction of composite membrane 16, the composite membrane 16 is composed of three elastic membranes 30a, 30b, 30c. Elastic membranes 30a, 30b, 30c have resonance frequencies for vibrations in the out-of-plane direction of composite membrane 16 that differ from each other.

As a result, in the acceleration mode, the various elastic membranes 30a, 30b, 30c vibrate in the out-of-plane direction of composite membrane 16 corresponding to variation in the rotational velocity of the engine.

Consequently, the intake pulsation at the first frequency, and the suction noises at the second frequency and third frequency are amplified corresponding to variation in the rotational velocity of the engine, and the amplified suction noise is emitted from the second opening of additional pipe 14 on the external air side. The emitted suction noise is propagated via the air into the vehicle passenger compartment, so that an impressive suction noise is transmitted into vehicle passenger compartment 2.

As a result, it is possible to generate the suction noise at plural frequencies by via composite membrane 16, and it is possible to generate an impressive suction noise without a requirement of plural intake ducts. Because there is no need for plural intake ducts in this embodiment, freedom of layout is improved, allowing device 1 to be adopted on a variety of vehicles with different constructions, such as vehicles having different body sizes.

Also, viewing the device for amplifying suction noise of the present embodiment in the thickness direction, composite membrane 16 is comprised of three elastic membranes, and these elastic membranes are formed with different areas, so that they have different vibration frequencies in the out-of-plane direction of composite membrane 16.

Consequently, by selecting the areas of the respective elastic membranes corresponding to resonance frequencies for vibration in the out-of-plane direction of composite membrane 16, it is possible to set the resonance frequencies of the elastic membranes at the respective desired resonance frequencies.

As a result, it is possible to set the resonance frequencies for vibration in the out-of-plane direction of the various elastic membranes comprising composite membrane 16 at the plural desired frequencies, and it is possible to expand the frequency band range where amplifying the suction noise can be realized. As a result, it is possible to improve the sound quality of the suction noise directed into the vehicle passenger compartment.

Second Embodiment

Figure 7:
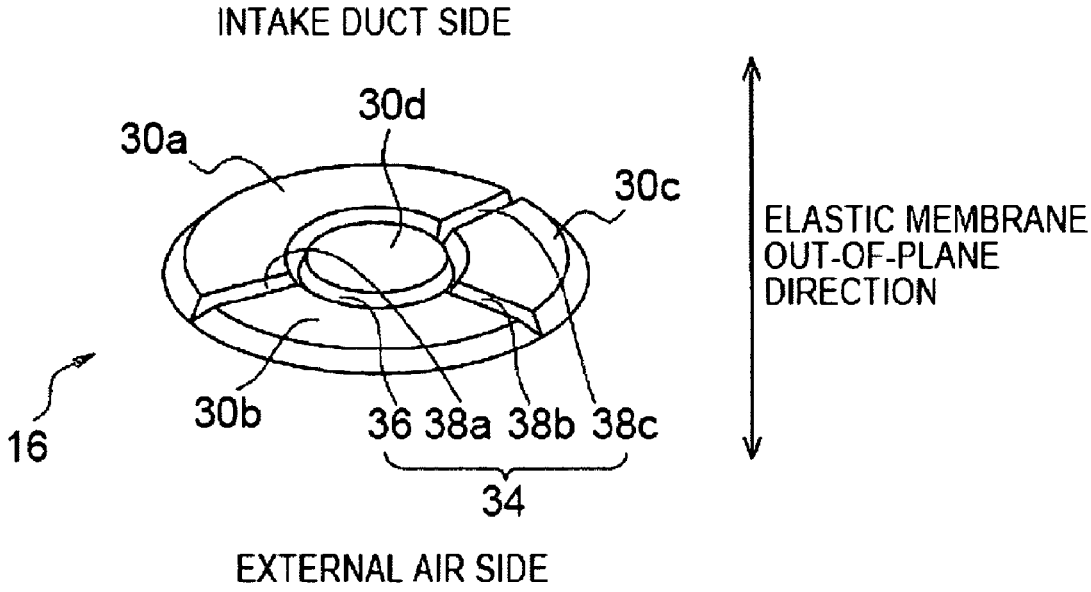
FIG. 7 is a diagram illustrating the structure of a composite membrane of the device for amplifying the suction noise of a vehicle in a second embodiment.

Turning to FIG. 7, a second embodiment will be explained. FIG. 7 is a diagram illustrating the structure of composite membrane 16 for device 1 for amplifying the suction noise of a vehicle.

As can be seen from FIG. 7, the structure of device 1 for amplifying the suction noise of a vehicle C in the second embodiment is the same as that of the first embodiment, except for the structure of composite membrane 16. That is, composite membrane 16 in the second embodiment is divided by rigidity changing portions 34 formed between every pair of adjacent elastic membranes and having rigidities different from those of said elastic membranes 30a-30d. Viewed in the thickness direction, composite membrane 16 has four elastic membranes 30a-30d.

Rigidity changing portions 34 include an annular rigidity changing portion 36 and radial rigidity changing portions 38a-38c.

Annular rigidity changing portion 36 is formed as a slot arranged in the surface of composite membrane 16 on an intake duct side of composite membrane 16. Annular rigidity changing portion 36 is shaped to surround a portion of composite membrane 16 that includes the center of composite membrane 16, and it has an overall circular or elliptical shape. In the second embodiment, the center portion surrounded with annular rigidity changing portion 36 is referred to as elastic membrane 30d in the following description.

Similar to annular rigidity changing portion 36, radial rigidity changing portions 38a-38c are formed as slots in the surface of composite membrane 16 on the intake duct side of composite member 16, and annular rigidity changing portions 38a-38d extend from annular rigidity changing portion 36 towards an outer periphery of composite membrane 16, so that they divide the portions other than that surrounded by annular rigidity changing portion 36 into plural portions. With regard to radial rigidity changing portions 38a-38c in the second embodiment, an example is explained in which three radial rigidity changing portions 38a-38c are formed extending from annular rigidity changing portion 36 towards the outer periphery of composite membrane 16. Also, in explanation of the second embodiment, the three elastic membranes 30 divided by said three radial rigidity changing portions 38a-38c are described as elastic membranes 30a-30c, respectively.

Elastic membranes 30a-30d are formed into shapes with different areas by means of rigidity changing portions 34. More specifically, area Sa of elastic membrane 30a is larger than area Sb of elastic membrane 30b; area Sb of elastic membrane 30b is larger than area Sc of elastic membrane 30c; and area Sc of elastic membrane 30c is larger than area Sd of elastic membrane 30d. That is, elastic membranes 30a-30d are formed to satisfy the following relationship: Sa>Sb>Sc>Sd.

Also, because elastic membranes 30a-30d have different areas, their resonance frequencies in the out-of-plane direction of composite membrane 16 are different from each other. More specifically, assuming the resonance frequency of elastic membrane 30a to be first resonance frequency f1, the resonance frequency of elastic membrane 30b to be second resonance frequency f2, the resonance frequency of elastic membrane 30c to be third resonance frequency f3, and the resonance frequency of elastic membrane 30d to be fourth resonance frequency f4, the following relationship is established: f1<f2<f3<f4.

Also, elastic membranes 30a-30d are appropriately shaped such that their resonance frequencies match those of the intake pulsations at the first frequency, the second frequency, the third frequency and the fourth frequency, selected from among the intake pulsations at plural frequencies that form the intake pulsation generated in conjunction with the intake operation of engine 8. More specifically, first resonance frequency f1 of elastic membrane 30a matches the frequency of the intake pulsation at the first frequency, second resonance frequency f2 of elastic membrane 30b matches the frequency of the intake pulsation at the second frequency, third resonance frequency f3 of elastic membrane 30c matches the frequency of the intake pulsation at the third frequency, and fourth resonance frequency f4 of elastic membrane 30d matches the frequency of the intake pulsation at the fourth frequency.

Here, the first frequency is lower than the second frequency, the second frequency is lower than the third frequency, and the third frequency is lower than the fourth frequency. That is, the first frequency, second frequency, third frequency and fourth frequency satisfy the following relationship: first frequency<second frequency<third frequency<fourth frequency.

The first frequency is the frequency of the intake pulsation generated when the engine rotates at a prescribed rotational velocity R1, the second frequency is the frequency of the intake pulsation generated at a prescribed rotational velocity R2, the third frequency is the frequency of the intake pulsation generated at a prescribed rotational velocity R3, and the fourth frequency is the frequency of the intake pulsation generated at a prescribed rotational velocity R4.

Here, R1 is a rotational velocity lower than R2, R2 is a rotational velocity lower than R3, and R3 is a rotational velocity lower than R4. That is, rotational velocities R1, R2, R3, R4 satisfy the following relationship: R1<R2<R3<R4.

The remaining structure of composite member 16 and device 1 is substantially the same as that of in the first embodiment.

The operation of device 1 that amplifies the suction noise according to the second embodiment will now be described. In the following description, because the structure of everything besides composite membrane 16 is substantially the same as in the first embodiment, only the operation of different parts will be explained.

When engine 8 is started, the intake pulsation generated in conjunction with the intake operation of engine 8 is propagated via intake manifold 28 and surge tank 26 into the air inside clean-side intake duct 18 (see FIG. 2).

While engine 8 is running, as the amount of accelerator pedal depression is increased, the airflow rate from air cleaner 22 to surge tank 26 is increased (hereinafter to be referred to as the acceleration mode). As a result, while the rotational velocity of engine 8 is increased, the intake vacuum generated in the air inside intake duct 10 rises (see FIG. 2).

When the engine is accelerating and the rotational velocity is R1, the intake pulsation at the first frequency, among the plural intake pulsations at different frequencies that form the intake pulsation generated in conjunction with the intake operation of engine 8, is propagated via connecting pipe 12 to the composite membrane 16.

Because the frequency of the intake pulsation at the first frequency matches first resonance frequency f1 of elastic membrane 30a, only elastic membrane 30a among elastic membranes 30a-30d vibrates in the out-of-plane direction of composite membrane 16. When elastic membrane 30a vibrates in the out-of-plane direction of composite membrane 16, it causes pressure variations in the air in additional pipe 14 on the side of composite membrane 16 that is open to the external air, and these air pressure variations become noise that is emitted to the external air side, such that the suction noise is amplified.

When the amount of accelerator pedal depression is further increased, that is, when the rotational velocity of the engine is at R2, from among the plural intake pulsations at different frequencies that form the intake pulsation in conjunction with the intake operation of engine 8, the intake pulsation at the second frequency is propagated via connecting pipe 12 to the composite membrane 16 (elastic membrane).

Because the frequency of the intake pulsation at the second frequency matches second resonance frequency f2 of elastic membrane 30b only elastic membrane 30b among elastic membranes 30a-30d vibrates in the out-of-plane direction of composite membrane 16. When elastic membrane 30b vibrates in the out-of-plane direction of composite membrane 16, pressure variations result in the air in the region between composite membrane 16 and the end of additional pipe 14 that is open to the external air, and air pressure variations become noise that is emitted to the external air side, thereby amplifying the suction noise.

When the amount of accelerator pedal depression is further increased, that is, when the rotational velocity of the engine is at R3, among the plural intake pulsations at different frequencies that form the intake pulsation in conjunction with the intake operation of engine 8, the intake pulsation at the third frequency is propagated via connecting pipe 12 to composite membrane 16.

Because the frequency of the intake pulsation at the third frequency matches third resonance frequency f3 of elastic membrane 30c, only elastic membrane 30c among elastic membranes 30a-30d vibrates in the out-of-plane direction of composite membrane 16. When elastic membrane 30c vibrates in the out-of-plane direction of composite membrane 16, pressure variations result in the air in the region between composite membrane 16 and the end of additional pipe 14 that is open to the external air, and said air pressure variations become noise that is emitted to the external air side, such that suction noise is amplified.

When the amount of accelerator pedal depression is further increased, that is, when the rotational velocity of the engine is at R4, among the plural intake pulsations at different frequencies that form the intake pulsation in conjunction with the intake operation of engine 8, the intake pulsation at the fourth frequency is propagated via connecting pipe 12 to composite membrane 16 (elastic membrane member).

Because the frequency of the intake pulsation at the fourth frequency matches fourth resonance frequency f4 of elastic membrane 30d, only elastic membrane 30d among elastic membranes 30a-30d vibrates in the out-of-plane direction of composite membrane 16 (elastic membrane member). When elastic membrane 30d vibrates in the out-of-plane direction of composite membrane 16, pressure variations result in the air in the region between composite membrane 16 and the end of additional pipe 14 that is open to the external air, and the air pressure variations become noise that is emitted to the external air side, thereby amplifying the suction noise.

Consequently, in the acceleration mode, elastic membranes 30a-30d with different resonance frequencies vibrate in the out-of-plane direction of composite membrane 16 corresponding to the variation in rotational velocity of engine 8. As a result, the suction noise at the first frequency, the suction noise at the second frequency, the suction noise at the third frequency and the suction noise at the fourth frequency are amplified, and the amplified suction noise is emitted to the external air side from the opening at the second end of additional pipe 14 (see FIG. 2).

When the amplified suction noise is emitted to the external air side from the second opening of additional pipe 14, the emitted suction noise is propagated via the air into vehicle passenger compartment 2, so that an impressive suction noise is transmitted into vehicle passenger compartment 2 (see FIG. 1).

Variations of the Second Embodiments

Viewing device 1 that amplifies the suction noise in the second embodiment, in the thickness direction of composite membrane 16, it may be seen that composite membrane 16 is composed of four elastic membranes 30a-30d. However, the second embodiment is not limited to this scheme. That is, viewing in the thickness direction of composite membrane 16, composite membrane 16 may be composed of five or more elastic membranes. In this case, composite membrane 16 may work with frequencies over a wider range than composite membrane 16 with just four elastic membranes 30a-30d as viewed in the thickness direction of composite membrane 16.

Viewing the device 1 for amplifying suction noise in the second embodiment in the thickness direction of composite membrane 16, composite membrane 16 is comprised of four elastic membranes 30a-30d. Elastic membranes 30a-30d are formed with different areas, and their resonance frequencies for vibration in the out-of-plane direction of composite membrane 16 are different from each other.

As a result, by selecting the different areas of elastic membranes 30a-30d according to resonance frequencies of vibration in the out-of-plane direction of composite membrane 16, it is possible to set the respective resonance frequencies of elastic membranes 30a-30d at the desired resonance frequencies.

Consequently, compared with the device for amplifying the suction noise of a vehicle in the first embodiment, that is, the device for amplifying the suction noise of a vehicle having three elastic membranes as viewed in the thickness direction, it is possible to further expand the frequency range where the suction noise can be amplified, and it is possible to improve the sound quality of the suction noise transmitted into vehicle passenger compartment 2.

Third Embodiment

Figure 8:
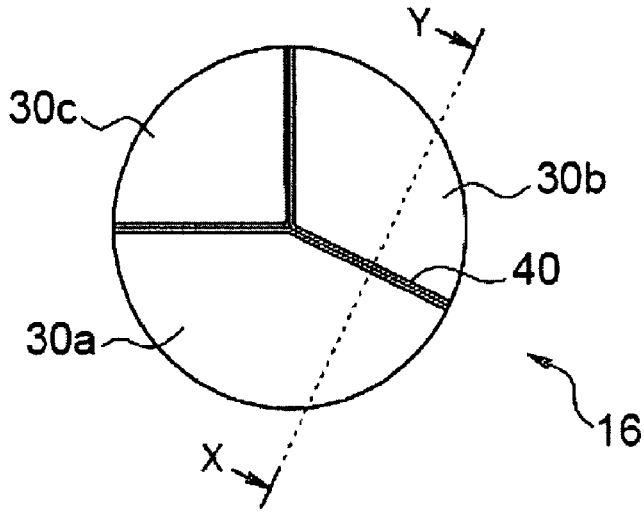
FIG. 8 is a diagram illustrating the structure a composite membrane of the device for amplifying the suction noise of a vehicle in a third embodiment
Figure 9:
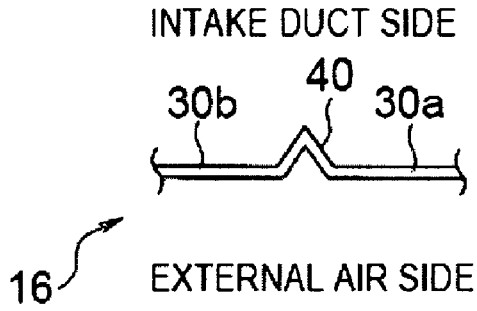
FIG. 9 is a cross section of the composite membrane taken across X-Y in FIG. 8.

Referring to FIGS. 8 and 9, a third embodiment will be explained. FIGS. 8 and 9 are diagrams illustrating the structure of device 1 that amplifies suction noise in the third embodiment. FIG. 8 is a diagram illustrating the structure of composite membrane 16, and FIG. 9 is a cross section taken across X-Y in FIG. 8.

As shown in FIGS. 8 and 9, the structure of device 1 that amplifies suction noise in the third embodiment is substantially the same as that of the first embodiment except for the structure of composite membrane 16. That is, the rigidity changing portion for composite membrane 16 in the third embodiment, is formed of convex portions 40 formed on the surface of composite membrane 16 on the intake duct side.

Viewed in the radial direction of composite membrane 16, convex portions 40 are each generally V-shaped and project toward the intake duct side when composite member 16 is installed in connecting pipe 12. The thickness of composite membrane 16 where convex portions 40 are formed is substantially equal to the thickness of the remaining portions. That is, composite membrane 16 is formed with a generally uniform thickness throughout. Composite membrane 16 with convex portions 40 formed thereon, may be formed by integral molding using dies.

The remainder of the structure of device 1 is generally the same as that of the first embodiment.

In the following, the operation of device 1 that amplifies the suction noise in the third embodiment will now be explained. Because the structure of everything besides composite membrane 16 is substantially the same as in the first embodiment, only the operation of the different portions will be explained in detail.

When engine 8 is started, the intake pulsation generated in conjunction with the intake operation of engine 8 is propagated via intake manifold 28 and surge tank 26 into the air inside clean-side intake duct 18 (see FIG. 2).

While engine 8 is running, as the amount of accelerator pedal depression is increased, the airflow rate from air cleaner 22 to surge tank 26 is increased (hereinafter to be referred to as acceleration mode). As a result, while the rotational velocity of engine 8 is increased, the intake vacuum generated for the air in intake duct 10 rises (see FIG. 2).

In the acceleration mode, when the amount of accelerator pedal depression is changed, the rotational velocity of the engine is changed. As a result, elastic membranes 30a-30c with different resonance frequencies vibrate in the out-of-plane direction of composite membrane 16 corresponding to the change in rotational velocity of engine 8. As a result, pressure variations occur in the air in the region between composite membrane 16 and the end of additional pipe 14 that is open to the external air. The air pressure variations are emitted as noise to the external air side, so that the suction noise corresponding to the first frequency, the suction noise corresponding to the second frequency, and the suction noise corresponding to the third frequency are amplified (see FIG. 2).

When the amplified suction noise is emitted to the external air side from the opening at the second end of additional pipe 14, the emitted suction noise is propagated via the air into vehicle passenger compartment 2, so that an impressive suction noise is transmitted into vehicle passenger compartment 2 (see FIG. 1).

Variations of the Third Embodiment

As viewed in the radial direction of composite membrane 16, device 1 that amplifies the suction noise in the third embodiment has convex portions 40 formed on composite membrane 16, each being V-shaped and projecting to the intake duct side, and the thickness of composite membrane 16 is substantially uniform throughout when the shape is formed. However, the third embodiment is not limited to this scheme.

Figure 10A:
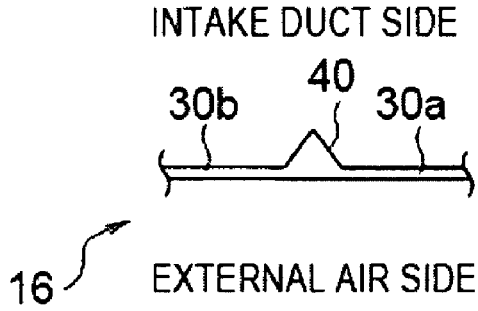
FIGS. 10A-10C are diagrams illustrating modified examples of the composite membrane of the device for amplifying the suction noise of a vehicle in the third embodiment.
Figure 10B:
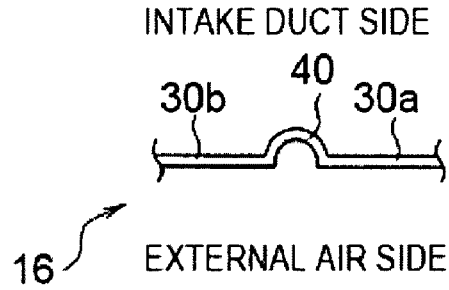
Figure 10C:
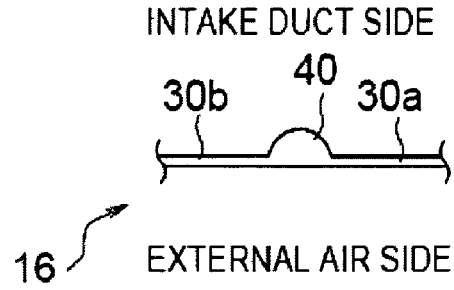

For example, as shown in FIG. 10A, a scheme may also be adopted in which the thickness of the portions of composite membrane 16 where convex portions 40 are positioned is thicker than the remaining portions. Also, as shown in FIG. 10B, a scheme may also be adopted in which convex portions 40 are each generally U-shaped as viewed in the radial direction of composite membrane 16, and the thickness of composite membrane 16 is substantially uniform throughout. In addition, for example, as shown in FIG. 10C, a scheme may be adopted in which convex portions 40 are each U-shaped projecting toward the intake duct side as viewed in the radial direction of composite membrane 16, and the thickness of composite membrane 16 where convex portions 40 are formed is thicker than the remaining portions.

Figure 11A:
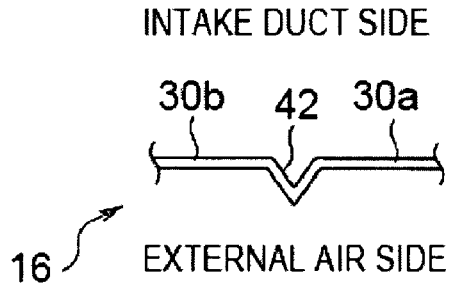
FIG. 11A-11D are diagrams illustrating modified examples of the composite membrane of the device for amplifying the suction noise of a vehicle in the third embodiment.
Figure 11B:
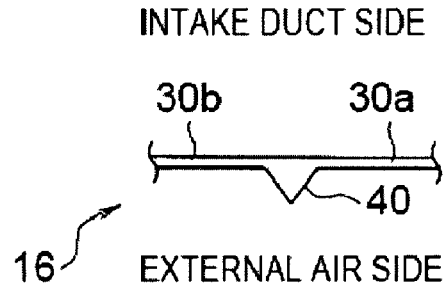
Figure 11C:
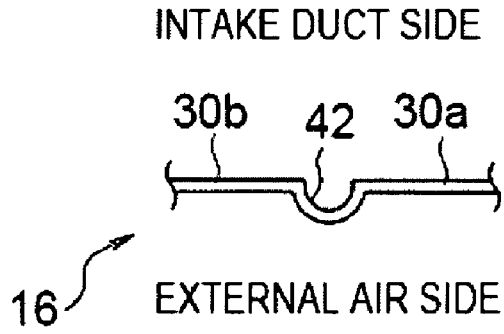
Figure 11D:
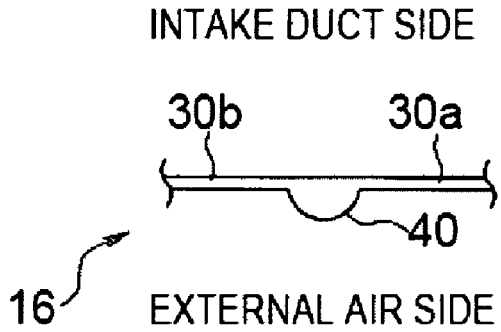

The rigidity changing portions in device 1 that amplifies suction noise in the present embodiment consist of convex portions 40 formed on the surface of composite membrane 16 on the intake duct side. The third embodiment is not limited to this scheme, however. For example, as shown in FIGS. 11A and 11C, the rigidity changing portions may also comprise generally concave portions 42 formed in the surface of composite membrane (elastic membrane member) 16 on the intake duct side. And, as shown in FIGS. 11B and 11D, a scheme may also be adopted in which the rigidity changing portions comprise generally convex portions 40 formed on the surface of composite membrane 16 on the external air side.

The device 1 for amplifying the suction noise of a vehicle in the third embodiment has rigidity changing portions that divide composite membrane 16 into plural elastic membranes by convex or concave portions 40, 42 formed on the surface of composite membrane 16 on the intake duct side. As a result, composite membrane 16 may be formed with plural elastic membranes by means of a simple structure.

As a result, it is possible to prevent increased manufacturing costs for composite membrane 16, to prevent increased manufacturing costs for the device 1 for amplifying the suction noise of a vehicle, and to improve the producibility of the device for amplifying the suction noise of a vehicle.

Fourth Embodiment

Figure 12:
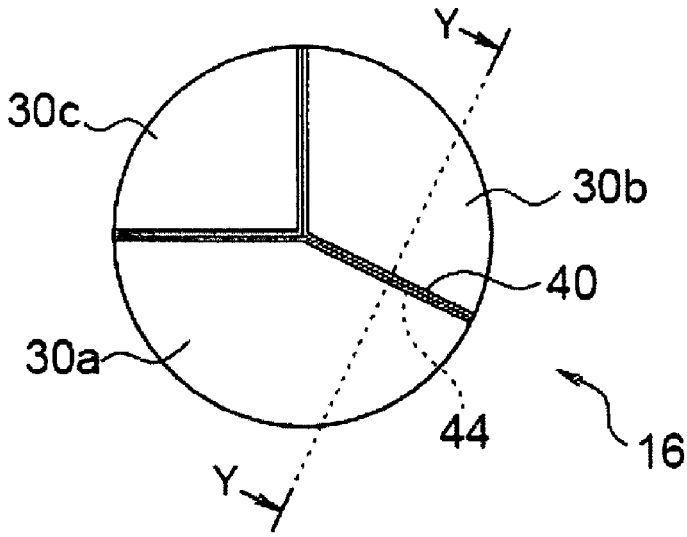
FIG. 12 is a diagram illustrating the structure of the composite membrane of the device for amplifying the suction noise of a vehicle in a forth embodiment.
Figure 13:
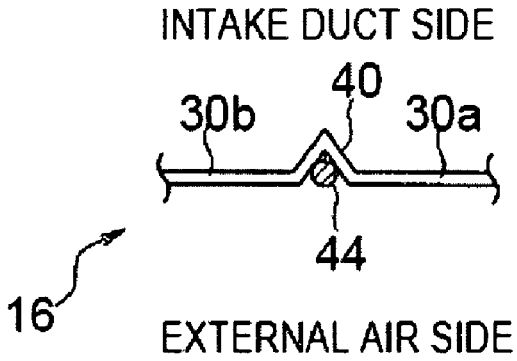
FIG. 13 is a cross section of the composite membrane taken across Y-Y in FIG. 12.

Referring to FIGS. 12 and 13, a fourth embodiment will be explained. FIGS. 12 and 13 are diagrams illustrating the structure of composite membrane 16 for device 1 that amplifies suction noise in the fourth embodiment. FIG. 13 is a cross section of composite member 16 taken across Y-Y in FIG. 12.

As shown in FIGS. 12 and 13, the structure of device 1 that amplifies suction noise in the fourth embodiment is generally the same as that of the first embodiment except for the structure of composite membrane 16. That is, the rigidity changing portion of composite membrane 16 in the fourth embodiment is formed of convex portions 40 formed on the surface of composite membrane 16 on the intake duct side, and each convex portion 40 has a core member 44.

Viewed in the radial direction of composite membrane 16, each convex portion 40 is generally nV-shaped and projects toward the intake duct side. The thickness of the portions of composite membrane 16 where convex portions 40 are formed is substantially equal to the thickness of the remaining portions. That is, thickness of composite membrane 16 is substantially uniform throughout.

Core member 44 is made of a wire material more rigid than composite membrane 16, and it is arranged on the surface of composite membrane 16 on the external air side.

The remainder of the structure of device 1 is generally the same as that of the first embodiment 1.

In the following description, the operation of device 1 that amplifies suction noise in the fourth embodiment will be explained. Because the structure of everything besides composite membrane 16 is generally the same as in the first embodiment, only the operation of the different portions will be explained in detail.

When engine 8 is started, the intake pulsation generated in conjunction with the intake operation of engine 8 is propagated via intake manifold 28 and surge tank 26 into the air inside clean-side intake duct 18 (see FIG. 2).

While engine 8 is running, as the amount of accelerator pedal depression is increased, the airflow rate from air cleaner 22 to surge tank 26 is increased (hereinafter to be referred to as acceleration mode). As a result, while the rotational velocity of engine 8 is increased, the intake vacuum generated in the air inside intake duct 10 rises (see FIG. 2).

In the acceleration mode, when the amount of accelerator pedal depression is changed, the rotational velocity of the engine is changed. As a result, elastic membranes 30a-30c with different resonance frequencies vibrate in the out-of-plane direction of composite membrane 16 corresponding to changes in the rotational velocity of engine 8. As a result, pressure variations develop in the air in the region between composite membrane 16 and the end of additional pipe 14 open to the external air. The air pressure variations become noise emitted to the external air side, so that the suction noise corresponding to the first frequency, the suction noise corresponding to the second frequency, and the suction noise corresponding to the third frequency are amplified, and the amplified suction noise is emitted to the external air side from the second opening of additional pipe 14 (see FIG. 2).

When the amplified suction noise is emitted to the external air side from the second opening of additional pipe 14, the emitted suction noise is propagated via the air into vehicle passenger compartment 2, so that an impressive suction noise is transmitted into vehicle passenger compartment 2 via dash panel 4 (see FIG. 1).

Variations of the Fourth Embodiment

Figure 14A:
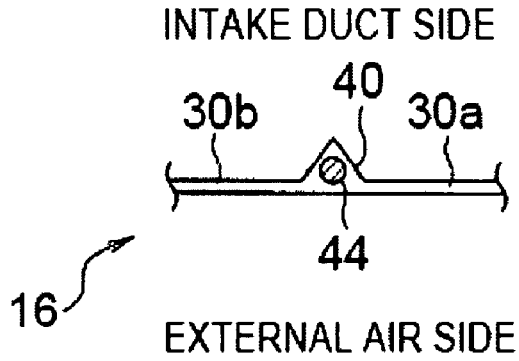
FIGS. 14A-14C are diagrams illustrating modified examples of the composite membrane of the device for amplifying the suction noise of a vehicle the fourth embodiment.
Figure 14B:
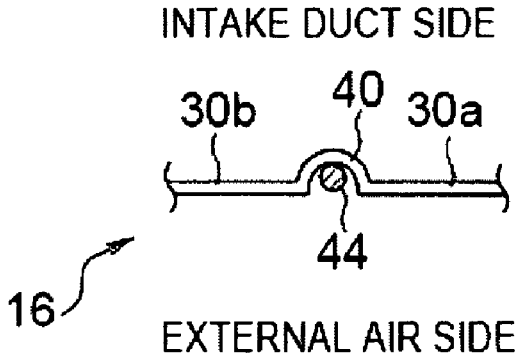
Figure 14C:
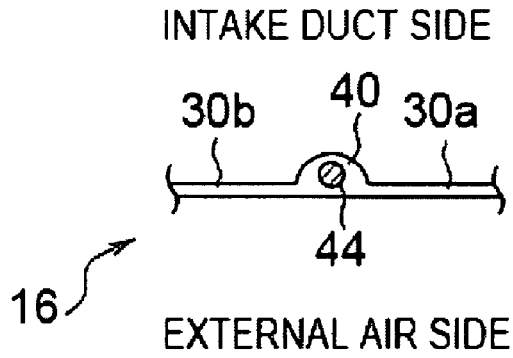

Convex portions 40 formed on composite membrane 16 of device 1 that amplifies the suction noise in the present embodiment are each generally V-shaped and project to the intake duct side as viewed in the radial direction of composite membrane 16. The thickness of composite membrane 16 is substantially uniform throughout when the shape is formed, and core member 44 is arranged on the surface of composite membrane 16 on the external air side. However, the fourth embodiment is not limited to this scheme. For example, as shown in FIG. 14A, a scheme may also be adopted in which the thickness of composite film 16 where convex portions 40 are set is greater than in the remaining portions, with core member 44 being arranged inside convex portions 40 set on composite membrane 16. Also, as shown in FIG. 14B, a scheme may also be adopted in which each convex portion 40 is generally U-shaped as viewed in the radial direction of composite membrane 16. In addition, for example, as shown in FIG. 14C, a scheme may also be adopted in which each convex portion 40 of composite film 16 is generally U-shaped and projects toward the intake duct side as viewed from the radial direction of composite membrane 16, and the composite membrane 16 is formed thicker where convex portions 40 are set than in the remaining portions, with core member 44 being arranged inside the convex portions 40.

Figure 15A:
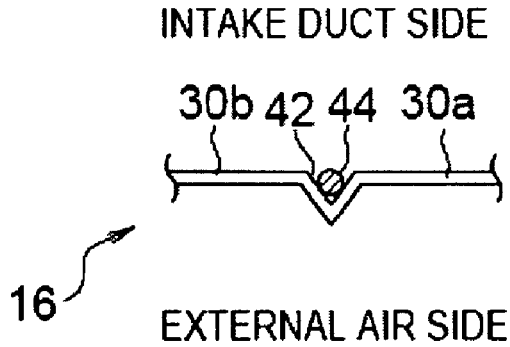
FIGS. 15A-15D are diagrams illustrating modified examples of the composite membrane of the device for amplifying the suction noise of a vehicle in the fourth embodiment.
Figure 15B:
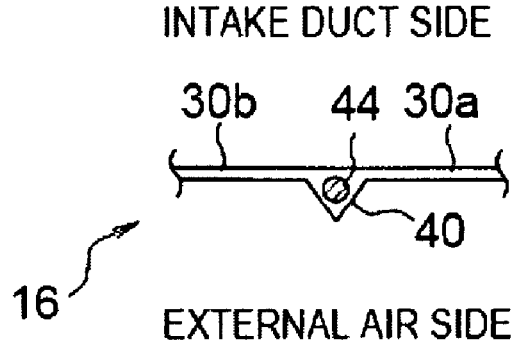
Figure 15C:
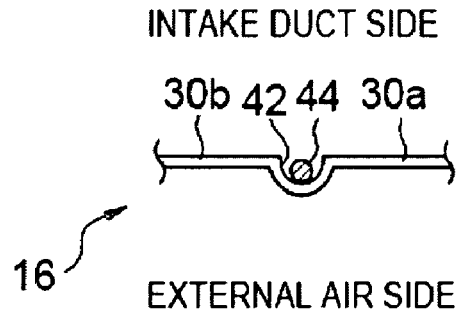
Figure 15D:
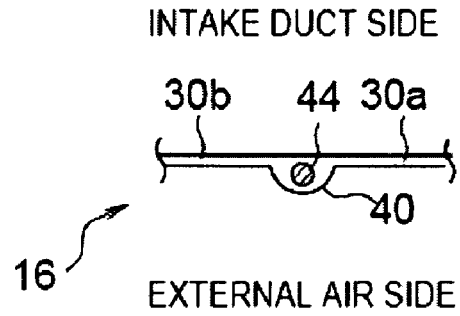

The rigidity changing portions of device 1 that amplifies suction noise in the fourth embodiment comprise convex portions 40 formed on the surface of composite membrane 16 on the intake duct side. However, the fourth embodiment is not limited to this scheme. For example, as shown in FIGS. 15A and 15C, the rigidity changing portions can also comprise concave portions 42 formed on the surface of the composite membrane 16 on the intake duct side, and as shown in FIGS. 15B and 15D, a scheme may also be adopted in which the rigidity changing portions consist of convex portions 40 formed on the surface of composite membrane 16 on the external air side.

The device 1 for amplifying the suction noise of a vehicle in the fourth embodiment has rigidity changing portions that divide composite membrane 16 into plural elastic membranes by convex portions 40 formed on the surface of the composite membrane on the intake duct side, and the convex portions each have a core member.

Thus composite membrane 16 may be formed with plural elastic membranes with a simple structure, and at the same time, the strength of the convex portions 40 may be increased.

As a result, it is possible to increase the producibility of the device 1 for amplifying the suction noise of a vehicle, and at the same time, the strength of composite membrane 16 may be increased compared to that in the device for amplifying the suction noise of a vehicle in the third embodiment, so that the durability of composite membrane 16 may be improved.

Fifth Embodiment

Figure 16:
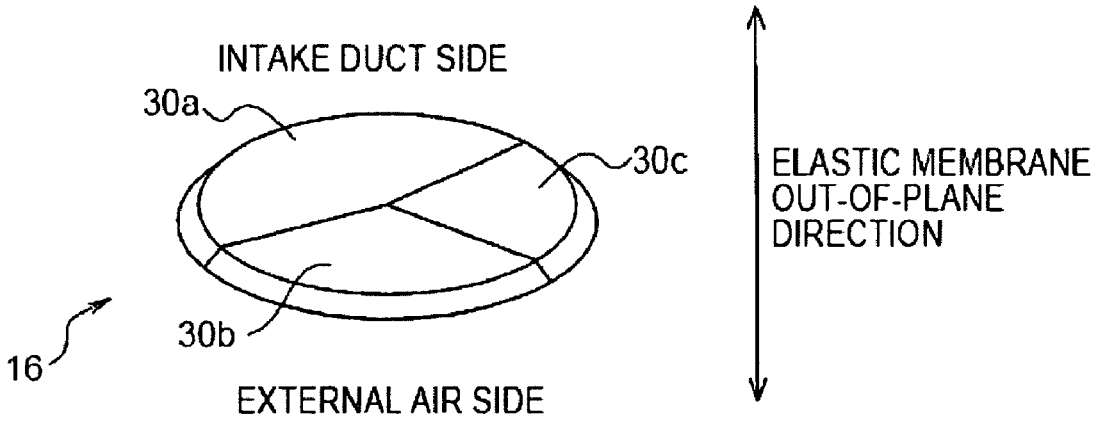
FIG. 16 is a diagram illustrating the structure of a composite membrane for the device for amplifying the suction noise of a vehicle in a fifth embodiment.

Referring to FIG. 16, a fifth embodiment will be explained. FIG. 16 is a diagram illustrating the structure of composite member 16 of device 1 that amplifies suction noise in the present embodiment.

As shown in FIG. 16, the structure of device 1 that amplifies suction noise in the fifth embodiment is substantially the same as that of the first embodiment except for the structure of composite membrane 16. That is, elastic membranes 30a-30c of composite membrane 16 in the fifth embodiment are made of materials having different modulus values. Here, the modulus refers to the property representing resistance to deformation of the object per unit volume. When the deformation and stress are proportional to each other, the modulus is the proportionality coefficient, and it depends on the material. Also, rigidity refers to the proportionality coefficient between a bending and twisting force applied to a structural body and the overall change in the structural body. The factors determining rigidity include the modulus of the material, the dimensions, and the shape of the structure. For example, when a material with a higher modulus is used, the rigidity is higher. When a single material is used, the thicker the sheet, the higher the rigidity. Also, the rigidity changes depending on the three-dimensional shape of the member that is obtained by pressing processes.

The modulus of elastic membrane 30a is lower than the modulus of elastic membrane 30b, and the modulus of elastic membrane 30b is lower than the modulus of elastic membrane 30c. Consequently, rigidity Ra of elastic membrane 30a is lower than rigidity Rb of elastic membrane 30b, and rigidity Rb of elastic membrane 30b is lower than rigidity Rc of elastic membrane 30c.

That is, the following relationship is established for elastic membranes 30a-30c: Ra>Rb>Rc.

Here, because elastic membranes 30a-30c have different rigidities, their resonance frequencies for vibration in the out-of-plane direction of composite membrane 16 are different from each other. Also, elastic membrane 30 with a higher rigidity has a lower resonance frequency for vibration in the out-of-plane direction than does elastic membrane 30 with a lower rigidity. Consequently, for elastic membranes 30a-30c, assuming the resonance frequency of elastic membrane 30a to be first resonance frequency f1, the resonance frequency of elastic membrane 30b to be second resonance frequency f2, and the resonance frequency of elastic membrane 30c to be third resonance frequency f3, the relationship f1<f2<f3 is established.

In composite membrane 16 of the fifth embodiment, elastic membranes 30a-30c are made of materials having different modulus values. As a result, the structure is divided into three elastic membranes 30a-30c without providing slots or other rigidity changing portions on the intake duct side of composite membrane 16.

The remaining features of the structure of the device 1 are substantially the same as those in the first embodiment.

In the following, the operation of device 1 that amplifies the suction noise in the fifth embodiment will be explained. Because the structure of everything besides composite membrane 16 is substantially the same as that in the first embodiment, only the operation of the different portions will be explained in detail.

When engine 8 is started, the intake pulsation generated in conjunction with the intake operation of engine 8 is propagated via intake manifold 28 and surge tank 26 into the air inside clean-side intake duct 18 (see FIG. 2).

While engine 8 is running, as the amount of accelerator pedal depression is increased, the airflow rate from air cleaner 22 to surge tank 26 is increased (hereinafter to be referred to as acceleration mode). As a result, while the rotational velocity of engine 8 is increased, the intake vacuum generated in the air inside intake duct 10 rises (see FIG. 2).

In this case, because said elastic membranes 30a-30c have different rigidity values, their resonance frequencies for vibration in the out-of-plane direction of composite membrane 16 are different from each other.

As a result, in the acceleration mode, as the amount of accelerator pedal depression is changed, the rotational velocity of the engine is changed. As a result, elastic membranes 30a-30c with different resonance frequencies vibrate in the out-of-plane direction of composite membrane 16 corresponding to changes in the rotational velocity of engine 8.

As a result, the intake pulsation at the first frequency, the intake pulsation at the second frequency and the intake pulsation at the third frequency are amplified, and the amplified suction noise is emitted to the external air side from additional pipe 14 (see FIG. 2).

When the amplified suction noise is emitted to the external air side from the opening at the other end of additional pipe 14, the emitted suction noise is propagated via the air into vehicle passenger compartment 2, so that an impressive suction noise is transmitted into vehicle passenger compartment 2 via dash panel 4 (see FIG. 1).

Variations of the Fifth Embodiment

In the fifth embodiment, elastic membranes 30a-30c of device 1 that amplifies the suction noise have rigidities different from each other, so that their resonance frequencies for vibration in the out-of-plane direction of composite membrane 16 are different from each other. However, the fifth embodiment is not limited to this scheme. That is, a scheme may also be adopted in which elastic membranes 30a-30c are made of materials having different mass values, so that they have different resonance frequencies for vibration in the out-of-plane direction of composite membrane 16. Also, one may adopt a scheme in which elastic membranes 30a-30c are made of materials different from each other with respect to their modulus and/or mass, so that they have different resonance frequencies for vibration in the out-of-plane direction of composite membrane 16.

For composite membrane 16 in the fifth embodiment, elastic membranes 30a-30c are made of materials having different modulus values. As a result, the structure is provided with three divided elastic membranes 30a-30c without setting slots or other rigidity changing portions on the intake duct side of composite membrane 16. However, the fifth embodiment is not limited to this scheme. For example, a scheme may also be adopted in which composite membrane 16 is composed of three separated elastic membranes 30a-30c by forming slots or other rigidity changing portions on the surface of composite membrane (elastic membrane member) 16 on the intake duct side, just as in any of the previous embodiments.

Viewed in the thickness direction of composite membrane 16, composite membrane 16 of the device 1 for amplifying the suction noise of a vehicle in the fifth embodiment is composed of three elastic membranes. Because the elastic membranes have different rigidity values, their resonance frequencies for vibration in the out-of-plane direction of composite membrane 16 are different from each other.

As a result, in the acceleration mode, the various elastic membranes vibrate in the out-of-plane direction of composite membrane 16 corresponding to changes in the rotational velocity of engine 8.

Consequently, the intake pulsation at the first frequency, the intake pulsation at the second frequency and the intake pulsation at the third frequency are amplified corresponding to changes in the rotational velocity of engine 8, and the amplified suction noise is emitted to the external air side from the second opening of the additional pipe. The emitted suction noise is propagated via dash panel 4 into vehicle passenger compartment 2, and an impressive suction noise is transmitted into vehicle passenger compartment 2.

As a result, it is possible to generate plural resonance frequencies with a single composite membrane 16, and an impressive suction noise may be generated without the need of plural intake ducts. Also, because the structure does not need plural intake ducts, the freedom of layout design may be improved, and device 1 may be adopted for vehicles with different body sizes or different structures.

Also, as viewed in the thickness direction, composite membrane 16 of the device 1 for amplifying suction noise in the fifth embodiment is composed of three elastic membranes, and these elastic membranes are made of materials with different modulus values, so that they have different frequencies for vibration in the out-of-plane direction of composite membrane 16.

Consequently, by selecting the modulus values of the elastic membranes corresponding to the respective resonance frequencies for vibration in the out-of-plane direction of composite membrane 16, it is possible to set the resonance frequencies of the elastic membranes at the respective desired resonance frequencies.

As a result, it is possible to set the resonance frequencies of the various elastic membranes for vibration in the out-of-plane direction of composite membrane 16 at plural desired frequencies, and it is possible to expand the range of frequency bands where amplification of the suction noise may be realized. As a result, it is possible to improve the sound quality of the suction noise transmitted into vehicle passenger compartment 2.

Also, because composite membrane 16 in the device 1 for amplifying the suction noise of a vehicle in the fifth embodiment has elastic membranes made of materials having different modulus values, composite membrane 16 is constituted as three separated elastic membranes without the provision of slots or other rigidity changing portions on the surface of composite membrane 16 on the intake duct side.

Consequently, the durability of composite membrane 16 is improved due to the lack of rigidity changing portions with thicknesses different from other portions set at the boundaries between adjacent elastic membranes of composite membrane 16.

The preceding description has been presented only to illustrate and describe exemplary embodiments of the oil return device according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method for amplifying the suction noise of a vehicle, comprising:

passing variations in air pressure transmitted into an engine intake port through a pipe that is connected to an engine, the variations in air pressure resulting in intake pulsations having one of at least two different frequencies;

resonating a first elastic member of a composite membrane at one of the at least two different frequencies;

resonating a second elastic member of the composite membrane at the other one of the at least two different frequencies; and varying the air pressure transmitted to an external air side in response to one of the resonated first elastic member and the resonated second elastic member.

2. A device for amplifying the suction noise of a vehicle, comprising:

an intake duct for feeding air to an engine intake port, a connecting pipe connected to an interior of the intake duct, and a composite membrane positioned within the connecting pipe, wherein the composite membrane blocks an interior passage formed in the connecting pipe, wherein the composite membrane includes at least two elastic membranes with one of masses and rigidities that differ from each other, each of the at least two elastic membranes vibrating in response to a different intake pulsation frequency.

3. The device for amplifying the suction noise of a vehicle described in claim 2, wherein the composite membrane further comprises a rigidity changing portion formed between the at least two elastic membranes, with the rigidity of the rigidity changing portion being different from that of the at least two elastic membranes.

4. The device for amplifying the suction noise of a vehicle described in claim 3, wherein the rigidity changing portion is one of a convex portion and concave portion formed on the surface of the composite membrane.

5. The device for amplifying the suction noise of a vehicle described in claim 3, wherein the rigidity changing portion further comprises a core member with a rigidity higher than that of the elastic membranes.

6. The device for amplifying the suction noise of a vehicle described in claim 3, wherein the rigidity changing portion further comprises:

at least an annular rigidity changing portion of one of a circular and elliptical shape and arranged inward of an outer periphery of the composite membrane, and radial rigidity changing portions that extend from said annular rigidity changing portion to the outer periphery of the composite membrane, and which divide the region between the portion surrounded by the annular rigidity changing portion and the outer periphery of the composite membrane into at least two portions.

7. The device for amplifying the suction noise of a vehicle described claim 3 wherein the at least two elastic membranes have different areas from each other.

8. The device for amplifying the suction noise of a vehicle described claim 7 wherein the rigidity changing portion refers to one of a convex portion and concave portion formed on a surface of the composite membrane.

9. The device for amplifying the suction noise of a vehicle described in claim 7 wherein the rigidity changing portion further comprises a core member with a rigidity higher than that of the elastic membranes.

10. The device for amplifying the suction noise of a vehicle described in claim 7 wherein the rigidity changing portion further comprises:

at least an annular rigidity changing portion of one of a generally circular and elliptical shape that is arranged inward of an outer periphery of the composite membrane, and radial rigidity changing portions that extend from the annular rigidity changing portion to the outer periphery of the composite membrane, and which divide the region between the portion surrounded by the annular rigidity changing portion and the outer periphery of the compo site membrane into at least two portions.

11. The device for amplifying the suction noise of a vehicle described in claim 2, wherein at least two elastic membranes are made of materials having one of different moduli and densities from each other.

12. The device for amplifying the suction noise of a vehicle described in claim 11 wherein:

the composite membrane has a rigidity changing portion formed between the at least two elastic membranes, with the rigidity of the rigidity changing portion being different from that of the at least two elastic membranes.

13. The device for amplifying the suction noise of a vehicle described in claim 12, wherein the rigidity changing portion is one of a convex portion and concave portion formed on the surface of the composite membrane.

14. The device for amplifying the suction noise of a vehicle described in claim 12 wherein the rigidity changing portion further comprises a core member with a rigidity higher than that of the elastic membranes.

15. The device for amplifying the suction noise of a vehicle described in claim 12 wherein the rigidity changing portion further comprises:

at least an annular rigidity changing portion of one of a generally circular and elliptical shape that is arranged inward of an outer periphery of the composite membrane, and radial rigidity changing portions that extend from the annular rigidity changing portion to the outer periphery of the composite membrane, and which divide the region between the portion surrounded by the annular rigidity changing portion and the outer periphery of the composite membrane into at least two portions.

16. The device for amplifying the suction noise of a vehicle described in claim 12 wherein the at least two elastic membranes have different thicknesses from each other.

17. The device for amplifying the suction noise of a vehicle described in claim 16 wherein the composite membrane further comprises a rigidity changing portion formed between the at least two elastic membranes, with the rigidity of the rigidity changing portion being different from that of the at least two elastic membranes.

18. The device for amplifying the suction noise of a vehicle described in claim 17 wherein the rigidity changing portion is one of a convex portion and concave portion formed on a surface of the compo site membrane.

19. The device for amplifying the suction noise of a vehicle described in claim 17 wherein the rigidity changing portion further comprises a core member with a rigidity higher than that of the elastic membranes.

20. The device for amplifying the suction noise of a vehicle described in claim 17 wherein the rigidity changing portion further comprises:

at least an annular rigidity changing portion of one of a generally circular or elliptical shape and arranged inward of an outer periphery of the composite membrane, and radial rigidity changing portions that extend from the annular rigidity changing portion to the outer periphery of the composite membrane, and which divide the region between the portion surrounded by the annular rigidity changing portion and the outer periphery of the composite membrane into at least two portions.

21. A device for amplifying the suction noise of a vehicle, comprising:

intake means for feeding air to an engine intake port, pipe means fluidly connected to the intake means, and composite membrane means positioned within the pipe means, wherein the composite membrane means blocks an interior passage formed in the pipe means, wherein the composite membrane means includes at least two elastic membranes with one of masses and rigidities that differ from each other, each of the at least two elastic membranes adapted to vibrate in response to a different intake pulsation frequency.

* * * * *